(12) United States Patent
Schlögl

(10) Patent No.: US 10,953,634 B2
(45) Date of Patent: Mar. 23, 2021

(54) COMPOSITE GLASS UNIT AND USE OF A COMPOSITE GLASS UNIT AS A FUNCTIONAL ELEMENT OF A BUILDING

(71) Applicant: sedak GmbH & Co. KG, Gersthofen (DE)

(72) Inventor: Fritz Schlögl, Stadtbergen (DE)

(73) Assignee: sedak GmbH & Co. KG, Gersthofen (DE)

( * ) Notice: Subject to any disclaimer, the term of this patent is extended or adjusted under 35 U.S.C. 154(b) by 0 days.

(21) Appl. No.: 16/724,240

(22) Filed: Dec. 21, 2019

(65) Prior Publication Data

US 2020/0254730 A1     Aug. 13, 2020

(30) Foreign Application Priority Data

Feb. 12, 2019    (DE) ...................... 10 2019 103 516.3

(51) Int. Cl.
*B32B 15/04*        (2006.01)
*B32B 17/06*        (2006.01)
(Continued)

(52) U.S. Cl.
CPC .......... *B32B 17/10045* (2013.01); *B32B 7/06* (2013.01); *B32B 7/12* (2013.01); *B32B 17/10293* (2013.01); *B32B 2419/00* (2013.01)

(58) Field of Classification Search
CPC ................ B32B 17/10045; B32B 7/06; B32B 17/10293; B32B 2419/00; B32B 3/02; B32B 3/06; E06B 3/6617; E06B 3/66
(Continued)

(56) References Cited

U.S. PATENT DOCUMENTS

| 4,942,711 A | * | 7/1990 | Bergquist | .................. E04D 3/08 |
| | | | | 52/204.591 |
| 6,280,826 B1 | * | 8/2001 | Woll | ................. B32B 17/10045 |
| | | | | 428/192 |

(Continued)

FOREIGN PATENT DOCUMENTS

| DE | 19958372 C1 | 1/2001 |
| DE | 19933119 A1 | 4/2001 |

(Continued)

OTHER PUBLICATIONS

Result of examination report for German Application No. 10 2019 103 516.3 filed Feb. 12, 2019.

(Continued)

*Primary Examiner* — Lauren R Colgan
(74) *Attorney, Agent, or Firm* — Paul D. Bianco; Gary S. Winer; Fleit Intellectual Property Law

(57) ABSTRACT

A composite glass unit includes first and second glass sheets and a third glass sheet disposed between the first and second sheets. A first bonding layer is disposed between the first and the third glass sheets; a second bonding layer is disposed between the second and the third glass sheets; and a connecting element is fitted into a cutout of the third glass sheet, with the connecting element connected via the first bonding layer to the first glass sheet and/or via the second bonding layer to the second glass sheet. The object of making available a composite glass unit in which no impairments occur in the region around the connecting elements is realized by a separating layer, which differs from the bonding layers and which is disposed between the end surface of the connecting element, the end surface facing the third glass sheet, and by the third glass sheet.

15 Claims, 2 Drawing Sheets

(51) Int. Cl.
    *B32B 17/10*  (2006.01)
    *B32B 7/06*   (2019.01)
    *B32B 7/12*   (2006.01)
(58) Field of Classification Search
    USPC .................................................. 428/426, 428
    See application file for complete search history.

(56) References Cited

U.S. PATENT DOCUMENTS

| | | | |
|---|---|---|---|
| 7,165,362 B2* | 1/2007 | Jobs | B32B 17/10009 |
| | | | 52/179 |
| 9,534,871 B2* | 1/2017 | Bertolini | F41H 5/263 |
| 9,909,309 B1* | 3/2018 | Conklin | B32B 17/10293 |
| 10,773,485 B2* | 9/2020 | Uebelacker | B32B 17/10293 |
| 2001/0023562 A1* | 9/2001 | Blobaum | E06B 3/5436 |
| | | | 52/235 |
| 2014/0079474 A1* | 3/2014 | Andreini | B32B 17/10293 |
| | | | 403/292 |
| 2015/0093539 A1* | 4/2015 | Krugmann | B32B 38/0004 |
| | | | 428/99 |

FOREIGN PATENT DOCUMENTS

| | | | |
|---|---|---|---|
| EP | 1010963 | A2 | 6/2000 |
| EP | 1843001 | A1 | 10/2007 |

OTHER PUBLICATIONS

European Search Report dated Jan. 29, 2020, for EP Application No. 19212384.2 (7 pages).

* cited by examiner

COMPOSITE GLASS UNIT AND USE OF A COMPOSITE GLASS UNIT AS A FUNCTIONAL ELEMENT OF A BUILDING

FIELD OF THE DISCLOSURE

The disclosure relates to a composite glass unit and to the use of a composite glass unit as a functional element of a building.

BACKGROUND

In the construction of modern buildings or individual elements of buildings, for example, façade elements or staircases, composite glass units are increasingly used as construction elements. A composite glass unit consists of a plurality of glass sheets which are connected to each other by means of bonding layers so as to be load-bearing. As a rule, the composite glass unit is produced by heating the configuration of glass sheets and the bonding layers disposed in between under pressure to temperatures above the processing temperature of the bonding layers and by subsequently cooling of the composite glass unit. The connection of the composite glass unit to support structures or the connection of a plurality of composite glass units to each other is implemented by means of connecting elements which are preferably integrated into the composite glass unit. In composite glass units comprising at least three glass sheets, the connecting elements can, in particular, be fitted into a cutout of an intermediate glass sheet disposed between two glass sheets. A composite glass unit of this type is disclosed, for example, in U.S. Pat. No. 7,165,362 B2. On the surfaces facing in the direction of the composite glass unit or in the direction of the individual glass sheets of the composite glass unit, the connecting element is bonded to the glass sheets via a bonding layer.

In modern architecture, the above-described composite glass units with the connecting element integrated therein are used especially because they have a wide range of applications and an attractive visual appearance. However, in the regions around the connecting element, the composite glass units frequently develop defects, especially in the form of delaminations, i.e., a separation of the glass sheets that are connected to each other or a separation of the connecting element that is connected to a glass sheet, and in the form of cracks in individual glass sheets. Impairments of this type occur especially during the manufacture of the composite glass units. However, damage of this type can also be observed during the installation of the composite glass units or in already installed composite glass units. The visual appearance of the composite glass unit is markedly impaired by the defect described.

SUMMARY

Thus, a need exists for a composite glass unit comprising at least three glass sheets which are bonded to each other via bonding layers and a connecting element which is integrated into the composite glass unit, wherein damage in the regions around the connecting element, particularly in the form of delaminations of or cracks in individual glass sheets of the composite glass unit, does not occur, and the use of such a composite glass unit as a functional element of a building.

The disclosure relates to a composite glass unit and the use of such a composite glass unit as a functional element of a building. Suitable embodiments and advantageous refinements are also disclosed.

The composite glass unit described above comprises at least one first glass sheet and one second glass sheet and a third glass sheet disposed between the first and the second glass sheet, wherein the third glass sheet has at least one cutout for receiving a connecting element. The cutout can be disposed at the edge of or completely on the inside of the third glass sheet. A first bonding layer for bonding the first glass sheet to the third glass sheet is disposed between the first glass sheet and the third glass sheet, and a second bonding layer for bonding the second glass sheet to the third glass sheet is disposed between the second glass sheet and the third glass sheet. The individual glass sheets are connected or, more specifically, bonded to each other via the first bonding layer and the second bonding layer, so as to be load-bearing. The first bonding layer and the second bonding layer can consist of the same material, for example, a rigid or high-strength polyvinyl butyral, an ethylene vinyl acetate or an ionoplast polymer. The first and the second bonding layer are preferably transparent. A connecting element is fitted into the one or more cutouts of the third glass sheet. Preferably, the shape of the cutout is substantially complementary to the shape of the connecting element; however, the cutout is designed to be slightly larger than the connecting element, so that the connecting element can be fitted into the cutout. The connecting element serves to connect the composite glass unit to a support structure or to connect a plurality of such composite glass units to each other. To this end, the connecting element is connected or, more specifically, bonded by means of the first bonding layer to the first glass sheet via a first surface facing the first glass sheet and/or by means of the second bonding layer to the second glass sheet via a second surface facing the second glass sheet. The above-described configuration ensures that the connecting element is connected to the first glass sheet and/or the second glass sheet so as to be load-bearing. For reasons relating to manufacturing technology and for reasons of stability, the thickness of the connecting element preferably conforms to the thickness of the third glass sheet.

In addition to the first, the second, and the third glass sheet, the composite glass unit may also comprise additional glass sheets, more specifically, the third glass sheet may also consist of a plurality of glass sheets that are bonded to each other. The glass sheets used can be glass sheets that have been produced by means of the float-glass method but any other glass sheets can be used as well.

The above-described impairments observed in the regions around the connecting element of prior-art composite glass units, especially the delaminations or the formation of cracks in individual glass sheets, result from stresses existing between the glass sheets and the connecting element and from stresses existing between the individual glass sheets. In the composite glass units known in the prior art, such stresses can develop especially in consequence of the manufacturing process, during which the assembly of the glass sheets, the bonding layers and the connecting element is heated to temperatures above the processing temperature of the first and/or the second bonding layer, which assembly is subsequently cooled (in particular, to temperatures below the glass transition temperature of the bonding layers). The stresses in the composite glass units known in the prior art are caused by a bonding layer which is disposed between one or each end surface of the connecting element and the third glass sheet, which end surface is facing in the direction of the third glass sheet. In particular, in the composite glass units known in the prior art, the first and/or second bonding layer disposed between the individual glass sheets is also disposed between the end surfaces of the connecting element and the third glass sheet, which end surfaces are facing in the direction of the third glass sheet. As a result, the connecting element is connected to the third glass sheet via the end surfaces facing in the direction of the third glass sheet. Thus, as a result of the production method of the composite glass unit, especially as a result of the cooling process, it is possible for stresses to occur between the individual elements of the composite glass unit in this area. The developing stresses are attributable to the different coefficients of linear expansion of the materials used. The coefficients of linear expansion of typically used bonding layers are in a range from approximately $100\text{-}150 \cdot 10^{-6}$ [1/K] (values at T=20° C.), while the coefficients of linear expansion of glass and the generally used connecting element, for example, titanium, are approximately in a range from $8.5\text{-}9 \cdot 10^{-6}$ [1/K]. During the manufacture of the composite glass unit, it is therefore possible for stresses to develop in the regions around the connecting element, especially in the regions around the end surfaces of the connecting element. More specifically, stresses perpendicular to the plane of the glass sheet can develop in the regions around an end surface of the connecting element. Because of the adhesive effect and the typically low elasticity of the bonding layer which is disposed between the connecting element and the third glass sheet, it is frequently not possible to compensate for existing stresses which ultimately lead to the above-described defects in the composite glass unit.

In the composite glass unit according to the disclosure, a separating layer, which differs from the first bonding layer and the second bonding layer and which does not rigidly connect the connecting element to the third glass sheet, is inserted between the end surface or each end surface of the connecting element and the third glass element, which end surface is facing in the direction of the third glass sheet. This separating layer is preferably inserted into the space between the end surface or end surfaces of the connecting element and the third glass sheet prior to the manufacture of the composite glass units. Depending on the composition and the properties of the separating layer, especially its viscosity and its occurrence in the form of a solid, the separating layer is inserted or embedded in the aforementioned space between the third glass sheet and the connecting element. Because of the arrangement of the separating layer between the end surfaces of the connecting element and the third glass sheet, the first or second bonding layer is prevented from flowing into this space during the manufacture of the composite glass unit. More specifically, this arrangement prevents the end surface or each end surface of the connecting element from sticking to the third glass sheet as a result of a bonding layer disposed in this area and the stresses resulting therefrom. In the regions around the connecting element, the separating layer reduces or prevents stresses that can develop especially as a result of the production process of the composite glass unit or as a result of additional temperature treatments and as a result of natural seasonal and diurnal temperature fluctuations. Especially for reasons relating to manufacturing technology and for reasons of visual appearance, the separating layer can have a thickness in the range of 1 to 5 mm, especially in the range of 2 to 3 mm. The separating layer preferably covers the entire area of the end surface or of each end surface of the connecting element, which end surface is facing in the direction of the third glass sheet. In addition, the separating layer also prevents contamination of the space between the third glass sheet and the connecting element, for example, if a connecting element is disposed at the edge, in which case dirt from the outside could otherwise penetrate into an open space. In addition, the separating layer also ensures that the connecting element, especially a connecting element made of metal, does not come into direct contact with the third glass sheet. Such direct contact could lead to damage to the third glass sheet, for example, to the formation of cracks caused by minimal movements of a connecting element, which adjoins the third glass sheet, relative to the third glass sheet. Furthermore, the separating layer also compensates for existing manufacturing tolerances or irregularities of the cutout or of the connecting element.

As already described above, the separating layer is preferably inserted into the space between the end surface or end surfaces of the connecting element and the third glass sheet prior to the formation of the composite glass units which is carried out at an increased temperature and pressure. As an alternative, however, it is also possible to first insert a complementarily shaped spacer into the space between the end surface or end surfaces of the connecting element and the third glass sheet, which spacer can be removed after the manufacture of the composite glass unit has been completed, and the space can subsequently be filled with the separating layer.

According to a preferred embodiment of the disclosure, the separating layer has a Shore A hardness below 90 according to DIN ISO 7619-1:2012-02, particularly below 60. More preferably, the separating layer has a Shore A hardness below 40, most preferably below 10. The Shore A hardness of the separating layer is markedly below the Shore A hardness (or a comparable measure, such as the modulus of elasticity under pressure) of the typically used bonding layers of the composite glass units. Using a separating layer with the Shore A hardness specified makes it possible for the otherwise developing stresses in the regions around the connecting element to be inhibited or to be absorbed by this separating layer and, consequently, for potential damage to the composite glass unit to be prevented. To prevent damage to the composite glass unit in the regions around the connecting element, the Shore A hardness given above is advantageous especially for separating layers with the above-described thickness in a range of 1 to 5 mm, especially in range of 2 to 3 mm.

According to a favorable configuration of the composite glass unit, the adhesion between the separating layer and the connecting element and/or the adhesion between the separating layer and the glass sheets and/or the adhesion between the separating layer and the bonding layers is lower than 1 $N/mm^2$. This means that there occurs virtually no stickiness or adhesion between the specified elements of the composite glass unit. The adhesion between the separating layer and the glass sheets and/or the connecting element is markedly lower than the adhesion between the typically used bonding layers and the glass sheets and/or the connecting element, which, as a rule, is considerably higher than 20 $N/mm^2$. In particular, the maximum value of 1 $N/mm^2$ specified for the adhesion between the separating layer and the above-mentioned elements of the composite glass unit is not exceeded even after completion of the manufacture of the composite glass unit and is therefore permanently maintained. As a result, the otherwise developing stresses in the regions around the connecting element are inhibited and damage to the composite glass unit is prevented.

According to an especially preferred embodiment of the disclosure, the separating layer is transparent, in particular, glass-clear. This ensures an attractive visual appearance of the composite glass unit, including especially in the regions around the connecting element.

According to a preferred configuration of the composite glass unit, the separating layer consists of an elastomer. This therefore makes available a dimensionally stable, but elastic separating layer which is well-suited to prevent and/or absorb the stresses described above. Using the appropriate elastomer, the manufacturing process allows a void-free, especially bubble-free, insertion of the elastomer into the space between the end surfaces of the connecting element and the third glass sheet without any appreciable adhesion existing between the elastomer and the bonding layers, the connecting element or the glass sheets. In particular, this allows the separating layer to be configured as a permanently sustainable and, at the same time, water-repellent and thermally stable separating layer. The separating layer preferably consists of a soft polyvinyl butyral or a silicone, more preferably a tempered silicone, most preferably a silicone which has been tempered multiple times. At least under the usual manufacturing conditions and conditions of use, the tempered silicone, especially the silicone which has been tempered multiple times, is fully reacted. Thus, there will be no further reaction with the other elements of the composite glass unit, especially not with the first or the second bonding layer. In addition, under the usual manufacturing conditions and conditions of use of the composite glass unit, components, such as softening agents or other substances, especially substances which impair the adhesive effect of the bonding layer, will not escape. Especially when the separating layer is made of silicone or a soft polyvinyl butyral, the separating layer can be inserted into the space between the end surfaces of the connecting element and the third glass sheet without voids, especially bubbles. Stresses in the regions around the connecting element, which can lead to the above-mentioned defects in the composite glass unit, are prevented when silicone or a soft polyvinyl butyral is used to form the separating layer. More specifically, silicone or a soft polyvinyl butyral makes it possible to produce a transparent, glass-clear separating layer. According to an especially preferred design, the separating layer consists of a condensation-polymerized or platinum-polymerized silicone. These silicones, which are known from medical technology, specifically meet the above-mentioned requirements or qualities of the separating layer. Thus, it is possible to create a separating layer made of a condensation-polymerized or platinum-polymerized silicone in the form of a transparent, permanently stable, elastic separating layer with the Shore A hardness specified above and the adhesive properties described.

According to a favorable configuration of the composite glass unit, via the first bonding layer, the first glass sheet is bonded across its full surface to the third glass sheet and/or via the second bonding layer, the second glass sheet is bonded across its full surface to the third glass sheet. In addition to advantages relating to manufacturing technology, this also ensures that the connection between the individual glass sheets has a high load-bearing capacity.

The above-described connection of the first surface of the connecting element facing the first glass sheet via the first bonding layer to the first glass sheet and/or the connection of the second surface of the connecting element facing the second glass sheet via the second bonding layer to the second glass sheet ensure(s) a load-bearing connection of the connecting element to the first glass sheet and/or the second glass sheet. Thus, by integrating the connecting element into the composite glass unit as described above, a load-bearing connection of the composite glass unit to a support structure or the connection of a plurality of composite glass units to each other via the connecting element is made possible. More specifically, using the configuration described, a load-bearing connection of the end surfaces of the connecting element to the third glass sheet, which is obviated by the separating layer according to the present disclosure, is not required. The configuration described also offers advantages with respect to the manufacture of the composite glass unit. For example, during the manufacture, the first bonding layer can be applied across the full surface of the first glass sheet, and subsequently, the third glass sheet and the connecting element, which is fitted into the cutout, can be placed onto the first bonding layer. No separate bonding layer is required for affixing the connecting element to the composite glass unit. Depending on the properties of the separating layer, this separating layer can be inserted into the space between the connecting element and the third glass sheet either before or after application of the second bonding layer and placement of the second glass sheet.

According to a preferred embodiment of the disclosure, the connecting element consists of a metal, especially of titanium, or of a metal alloy. This creates a load-bearing connecting element which makes it possible to attach the composite glass unit to a support structure or to connect a plurality of composite glass units to each other. The connecting element preferably consists of titanium, since, within the range of the manufacturing temperatures and the temperatures in which the composite glass unit is conventionally used, the thermal properties of titanium, especially the coefficient of linear expansion, approximately correspond to the thermal properties of the glass sheets used. Thus, undesirable stresses in the composite glass unit can be reduced or avoided.

The connecting element fitted into the cutout can preferably be accessed at least in part from the outside, i.e., from outside of the composite glass unit. A configuration of this type is required, in particular, to allow the composite glass unit to be attached to a support structure, for example, to allow the composite glass unit to be screwed to the support structure. If the cutout is disposed at the edge, an opening toward the outside is obviously provided. If the cutout is disposed on the inside of the third glass sheet, an opening for the cutout can be provided in the first glass sheet and/or the second glass sheet. In this case, the connecting element can be fitted with a rib-like member which extends into the opening of the first and/or the second glass sheet. A bonding layer or the above-described separating layer can be inserted into the space between the rib-like member, which extends through the opening of the first and/or the second glass sheet, and the glass sheet having the opening. In this case, the opening can be designed to be smaller than the connecting element in order to prevent the connecting element from being ejected through the opening. This furthermore makes it possible, at least in part, to establish a connection of the connecting element to the glass sheet having the opening via the bonding layer disposed between this glass sheet and the third glass sheet. Most preferably, the connecting element and/or the separating layer is/are disposed completely inside the cutout. If the connecting element is fitted with a rib-like member that extends through an opening of the first or second glass sheet, this rib-like member is preferably also disposed completely inside the opening. For the sake of post-production work on the composite glass unit, for example, for a subsequent finishing treatment of the edges and/or surfaces by means of grinding or polishing, it is recommended that the connecting element or a rib-like member of the connecting element and/or the separating layer not end flush with the outside edge or outside surface of the composite glass unit but instead be disposed so as to be slightly offset toward the inside. In this manner, defects in the composite glass unit caused by post-production work or damage to the tool used therefor caused by the connecting element or the separating layer, for example, by smearing the soft separating layer over the surface of the composite glass unit, can be avoided. If the cutout is disposed at the edge, the connecting element and/or the separating layer can be disposed so as to be offset, for example, by a certain distance toward the inside of the composite glass unit. The offset thus created along the outside edge of the composite glass unit makes it possible to subsequently insert, for example, an adapter for connecting the composite glass unit to a support structure, a spacer or a filling material.

According to a favorable configuration, the connecting element can be accessed from the outside of the composite glass unit or it has outwardly projecting means for connecting the composite glass unit to a support structure. For example, the connecting unit can have a threaded bore or an outwardly extending bolt, via which the composite glass unit can be affixed to a support structure or can be connected to additional composite glass units.

According to an especially favorable configuration of the composite glass unit, the cutout is disposed at the edge of the third glass sheet. This makes it possible to form a composite glass unit with a high load-bearing capacity using a simple manufacturing process, especially without additional openings, which would have to be integrated into the first glass sheet and/or the second glass sheet in order to attach the composite glass unit via the connecting element that is fitted into the cutout.

According to yet another configuration, the cutout is disposed on the inside of the third glass sheet, with the first glass sheet and/or the second glass sheet having an opening in the region of the cutout. The connecting element which is fitted into the cutout can be accessed through the opening, which allows the composite glass unit to be connected by means of the connecting element. The connecting element involved can, in particular, be a single connecting element or a connecting unit comprising two connecting elements, which can be accessed both through an opening of the first glass sheet and through an opening of the second glass sheet. The third glass sheet has a thickness suitable for receiving the connecting element or the connecting unit. As already described above, the third glass sheet can comprise a plurality of glass sheets that are connected to each other. Most preferably, the connecting element comprises at least one rib-like element which is routed through the one or more openings of the first glass sheet and/or of the second glass sheet. This ensures an especially favorable configuration and integration of the connecting element into the composite glass unit, which allows a load-bearing and stable connection of the composite glass unit to a support structure or a connection to additional composite glass units. According to an especially favorable configuration of the composite glass unit, the separating layer is disposed between the one or more rib-like elements and the one or more openings of the first glass sheet and/or of the second glass sheet. The inserted separating layer or layers ensure(s) prevents stresses in the composite glass unit in the region of the connecting element.

The composite glass unit formed as disclosed by the present disclosure is preferably used as a functional element of a building, in particular as a façade element, or as a functional element of a building facility, in particular a staircase. The composite glass units according to the present disclosure can be used as load-bearing and visually attractive construction elements. For example, it is possible to construct a building façade consisting of the composite glass units according to the present disclosure or a building element consisting of the composite glass units according to the present disclosure, e.g., a staircase.

BRIEF DESCRIPTION OF THE DRAWINGS

The composite glass unit according to the disclosure will be described below based on embodiment examples with reference to the accompanying drawings. These drawing shows.

DETAILED DESCRIPTION

Figure 1:
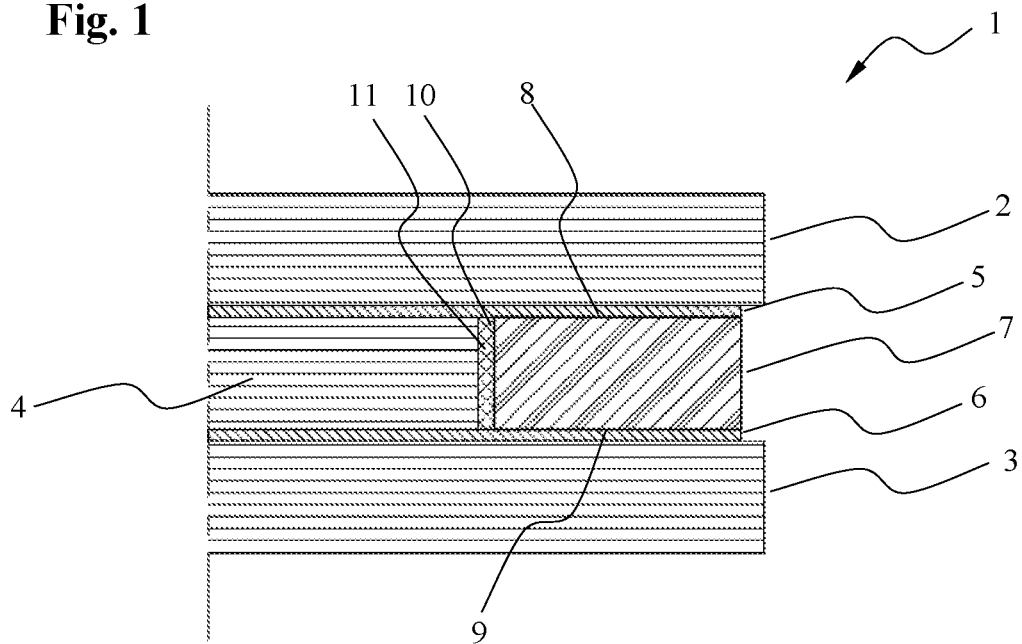
FIG. 1 a lateral section through a first composite glass unit in the region of a connecting element disposed along the edge.
Figure 2:
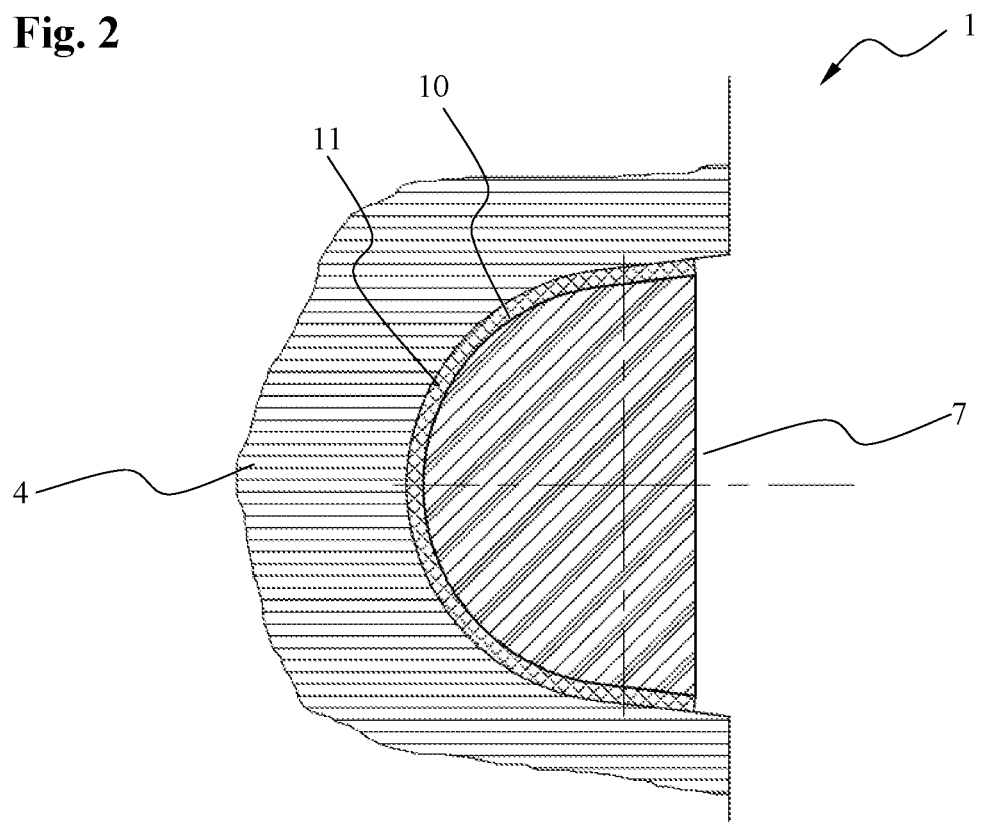
FIG. 2 a portion of a horizontal section through the intermediate glass sheet of the composite glass unit of FIG. 1.

FIG. 1 by way of an example shows a lateral section through a composite glass unit 1 in a first configuration. FIG. 2 shows a second horizontal section through the intermediate glass plate of the composite glass unit 1 of FIG. 1. The composite glass unit 1 comprises a first glass sheet 2, a second glass sheet 3, and a third glass sheet 4 disposed between the first glass sheet 2 and the second glass sheet 3. The first glass sheet 2 is connected or, more specifically, bonded, to the third glass sheet 4 via a first bonding layer 5, and the second glass sheet 3 is connected or, more specifically, bonded, to the third glass sheet 4 via a second bonding layer 6. Along its edge, the third glass sheet 4 has a cutout, into which a connecting element 7, especially a connecting element 7 made of titanium, is inserted. The thickness of the connecting element 7 corresponds to the thickness of the third glass sheet 4. As indicated in FIG. 2, the connecting element 7 is designed in the form of an approximate semicircle, with the third glass sheet 4 having a cutout complementary to that shape.

However, different configurations of the connecting element 7, with the cutout of the third glass sheet 4 having the appropriate complementary shape, are possible, for example, a connecting element 7 with a rectangular cross section. The connecting element 7 comprises means, not particularly shown in FIG. 1 and FIG. 2, for example, a threaded bore, for connecting the composite glass unit 1 to a support structure or for connecting it to additional composite glass units 1. The connecting element 7 is connected or, more specifically, bonded, to the first glass sheet 2 by means of the first bonding layer 5 via a first surface 8 facing the first glass sheet 2, and to the second glass sheet 3 by means of the second bonding layer 6 via a second surface 9 facing the second glass sheet 3. A separating layer 11 is disposed between an end surface 10 of the connecting element 7 and the third glass sheet 4, which end surface is facing in the direction of third glass sheet 4. The separating layer 11 preferably consists of a transparent tempered silicone or a soft polyvinyl butyral having a Shore A hardness below 10. Preferably, no appreciable adhesion exists between the separating layer 11 and the connecting element 7 and between the separating layer 11 and a glass sheet 2, 3, 4 and between the separating layer 11 and the bonding layers 5, 6. In this manner, stresses between the individual elements of the composite glass unit 1, which can be generated, particularly during the manufacture of the composite glass unit 1, and damage to the composite glass unit 1 attributable to such stresses can be prevented. The connecting element 7 and the separating layer 11 do not end flush with the outside edges of the glass sheets 2, 3, 4, but instead are disposed so as to be offset toward the inside. In this manner, it is possible to avoid damage to the composite glass unit 1, which can occur during post-production work on the composite glass unit 1 and a consequent interaction with the connecting element 7 and/or the separating layer 11. The offset thus created along the outside edge of the composite glass unit 1 makes it possible to subsequently insert, for example, an adapter for connecting the composite glass unit to a support structure, a spacer or a filling material. As shown in FIG. 1, in the region around the connecting element 7, the bonding layers 5, 6 can be disposed so as to be offset toward the inside as well. However, the composite glass unit 1 can also have a configuration in which the connecting element 7 and the bonding layers 5, 6 end flush with the outside edges of the glass sheets 2, 3, 4.

Figure 3:
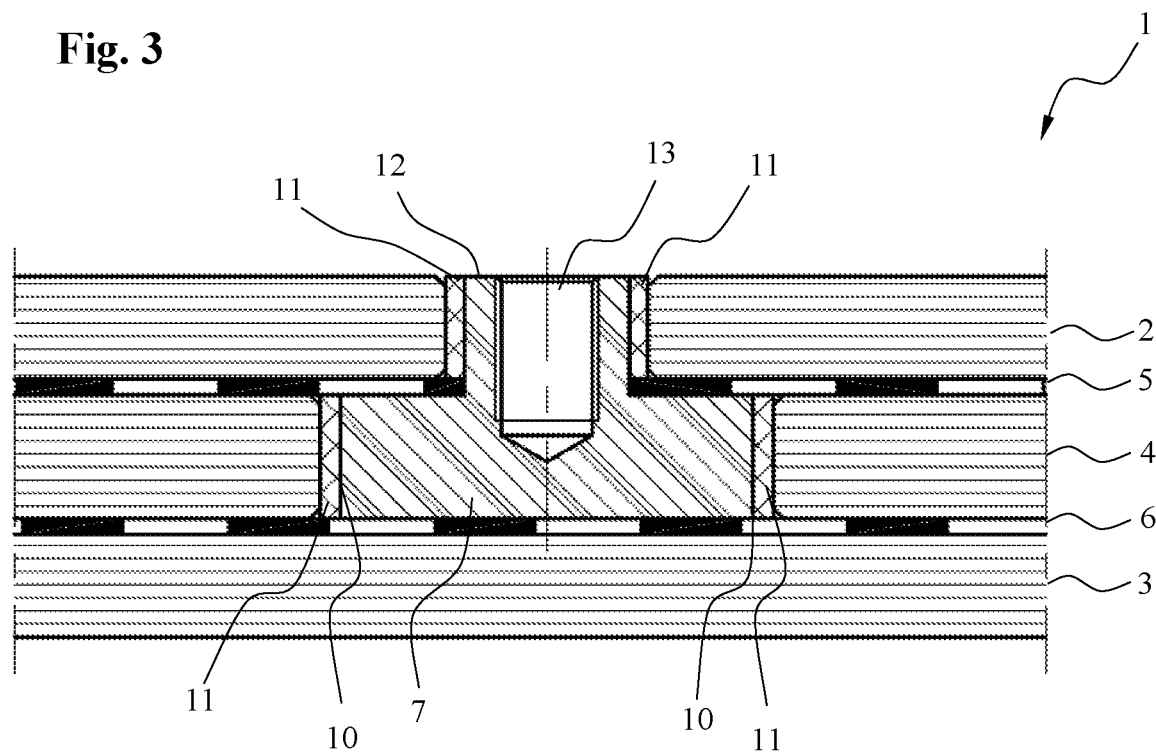
FIG. 3 a section through a second composite glass unit in the region of a connecting element disposed on the inside.

FIG. 3 by way of an example shows a section through a second embodiment of a composite glass unit 1 according to the present disclosure. In contrast to the composite glass unit 1 shown in FIG. 1 and FIG. 2, the composite glass unit 1 of FIG. 3 comprises a connecting element 7 which is fitted into a cutout disposed on the inside of the third glass sheet 4. The connecting element 7 has a rib-like element 12 which extends through an opening of the first glass sheet 2. As shown in FIG. 3, the opening of the first glass sheet 2 is especially designed to be smaller than the cutout of the third glass sheet 4. The connecting element 7 is connected via the second bonding layer 6 to the second glass sheet 3 and, at least in certain areas, via the first bonding layer 5 to the first glass sheet 2. As in the embodiment example shown in FIG. 1 and FIG. 2, the separating layer 11 is disposed between the end surfaces 10 of the connecting element 7 and the third glass sheet 4. The separating layer 11 is also disposed in the space between the rib-like elements 12, which extends through the opening of the first glass sheet 2, and the first glass sheet 2. The connecting element 7 shown in FIG. 3 comprises a bore 13 which extends through the rib-like element 12. Via a bolt which can be fitted into the bore 13, the composite glass unit 1 can be connected to a support structure or it can be connected to an additional composite glass unit 1. The bore 13 may in particular be provided with threads, wherein a bolt, in particular a screw, insertable therein has corresponding mating threads.

Figure 4:
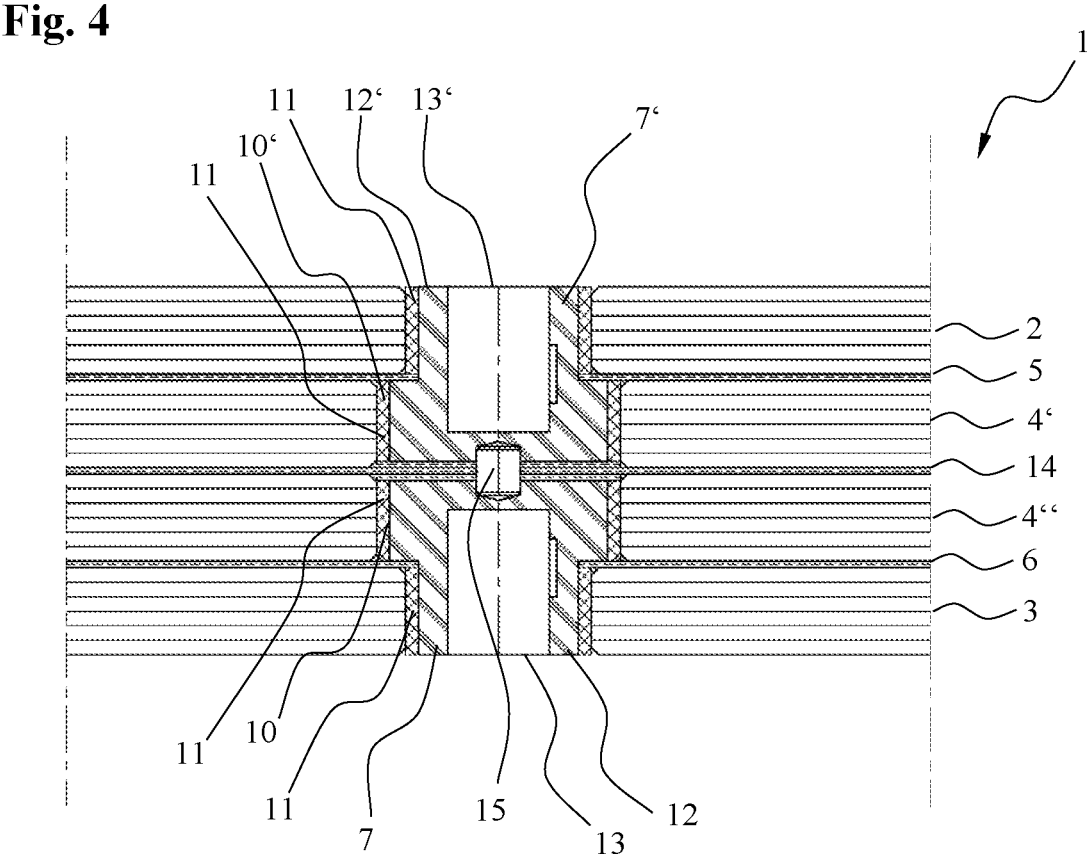
FIG. 4 a section through a third composite glass unit in the region of a connecting unit comprising two connecting elements disposed on the inside.

FIG. 4 by way of an example shows a section through a third embodiment of a composite glass unit 1 according to the present disclosure. Here, the third glass sheet 4 disposed between the first glass sheet 2 and the second glass sheet 3 comprises two glass plates 4', 4" which are connected to one another via a further bonding layer 14 which can consist of the material of the first bonding layer 5 or the second bonding layer 6. Integrated into the inside of the composite glass unit 1 is a connecting unit which comprises a first connecting element 7 and a second connecting element 7'. The connecting elements 7, 7' each has a respective rib-like element 12, 12', with the rib-like element 12 of the first connecting element 7 extending outwardly through an opening of the first glass sheet 2 and with the rib-like element 12' of the second connecting element 7' extending outwardly through an opening of the second glass sheet 3. The two connecting elements 7, 7' are connected to one another by means of a bonding layer 14 disposed between the glass plates 4', 4" of the third glass sheet 4 and by means of an additional connecting element 15 on the inside of the composite glass unit 1. In all other respects, the integration of the two connecting elements 7, 7' corresponds to the integration of the inner connecting element 7 of FIG. 3. The connecting elements 7, 7' furthermore have bores 13, 13' which allow the composite glass unit 1 to be connected on both sides to a support structure and/or to additional composite glass units 1.

The composite glass unit according to the disclosure is not limited to the embodiments shown in the drawings. In particular, a composite glass unit may comprise additional glass sheets and may have a plurality of connecting elements, especially including connecting elements that are integrated in different ways, i.e., connecting elements integrated both peripherally and internally. Neither is the configuration of the connecting elements limited to the connecting elements shown by way of an example in the drawings. In particular, the shape of the connecting elements, the design of the rib-like elements of the connecting elements, and the means of connecting the composite glass unit to a support structure or connecting it to additional composite glass units may differ from the embodiments shown by way of an example in the drawings.

The invention claimed is:

1. A composite glass unit comprising a first glass sheet, a second glass sheet, and a third glass sheet disposed between the first glass sheet and the second glass sheet, with the third glass sheet having at least one cutout for receiving a connecting element, a first bonding layer disposed between the first glass sheet and the third glass sheet for bonding the first glass sheet to the third glass sheet, and a second bonding layer disposed between the second glass sheet and the third glass sheet for bonding the second glass sheet to the third glass sheet, and a connecting element fitted into the at least one cutout of the third glass sheet, with a first surface of the connecting element facing the first glass sheet connected via the first bonding layer to the first glass sheet and/or a second surface of the connecting element facing the second glass sheet connected via the second bonding layer to the second glass sheet, wherein between the end surface or each end surface of the connecting element, which end surface is facing in the direction of the third glass sheet, and the third glass sheet, there is disposed a separating layer which differs from the first and second bonding layers and which does not rigidly connect the connecting element to the third glass sheet.

2. The composite glass unit of claim 1, wherein the separating layer has a Shore A hardness lower than 90.

3. The composite glass unit of claim 2, wherein the separating layer has a Shore A hardness below 40.

4. The composite glass unit of claim 1, wherein adhesion between the separating layer and the connecting element and/or adhesion between the separating layer and the glass sheets and/or adhesion between the separating layer and the first and second bonding layers is less than 1 N/mm$^2$.

5. The composite glass unit of claim 1, wherein the separating layer is transparent.

6. The composite glass unit of claim 1, wherein the separating layer is made of an elastomer.

7. The composite glass unit of claim 6, wherein the separating layer is made of a silicone or a polyvinyl butyral.

8. The composite glass unit of claim 1, wherein at least one of the first glass sheet and the second glass sheet is bonded across its full surface to the surface of the third glass sheet via the respective first bonding layer and second bonding layer.

9. The composite glass unit of claim 1, wherein the connecting element is made of a metal or metal alloy.

10. The composite glass unit of claim 1, wherein the connecting element can at least in part be accessed from the outside.

11. The composite glass unit of claim 1, wherein the connecting element is accessible from the outside or has outwardly extending means for connecting the composite glass unit to a support structure.

12. The composite glass unit of claim 1, wherein the cutout is disposed at an edge of the third glass sheet.

13. The composite glass unit of claim 1, wherein the cutout is disposed on an inside of the third glass sheet and at least one of the first glass sheet and the second glass sheet has an opening in the region of the cutout.

14. The composite glass unit of claim 13, wherein the connecting element comprises at least one rib-like member which extends through the opening, wherein the separating layer is preferably disposed between the at least one rib-like member and the opening.

15. A functional element of a building or a building facility, comprising the composite glass unit of claim 1.

* * * * *